March 28, 1939. W. I. SENGER 2,151,873
MACHINE TOOL
Filed Jan. 13, 1937 8 Sheets-Sheet 1

INVENTOR
Werner Irving Senger
BY
Fred G. Parsons
ATTORNEY

March 28, 1939.　　　W. I. SENGER　　　2,151,873
MACHINE TOOL
Filed Jan. 13, 1937　　　8 Sheets-Sheet 3
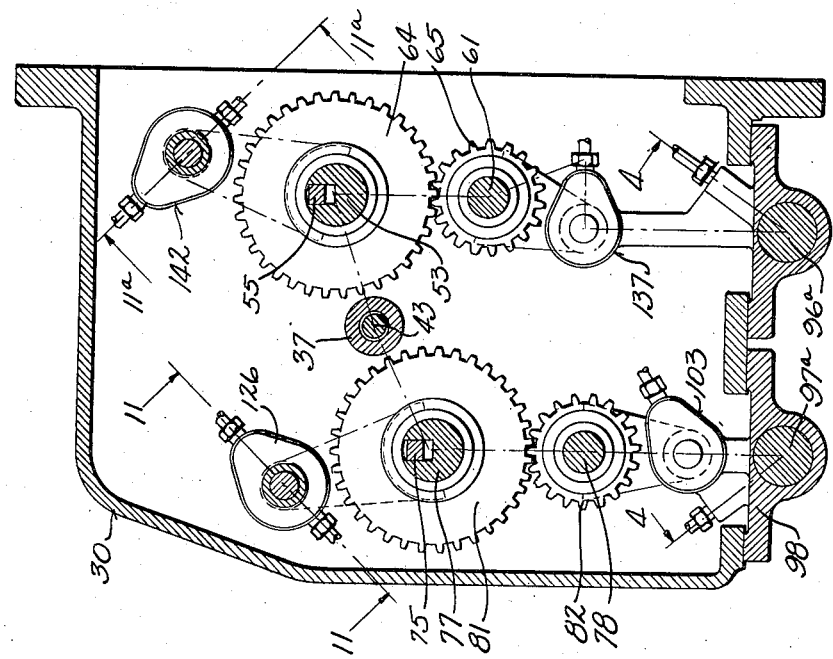
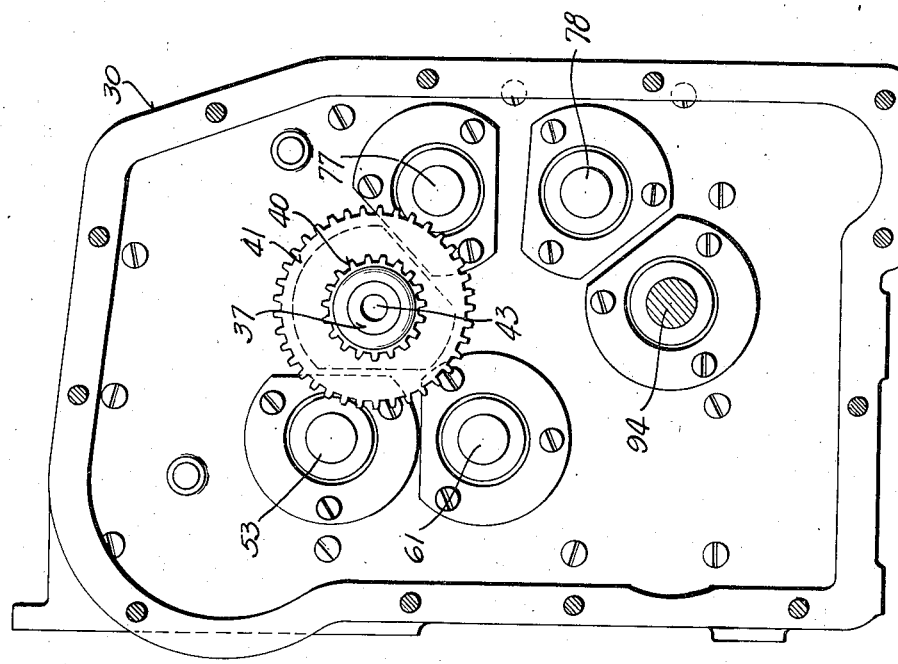
INVENTOR
Werner Irving Senger
BY
Fred A. Parsons
ATTORNEY March 28, 1939.  W. I. SENGER  2,151,873
MACHINE TOOL
Filed Jan. 13, 1937  8 Sheets-Sheet 5

INVENTOR
Werner Irving Senger
BY Fred G. Parsons
ATTORNEY

March 28, 1939. W. I. SENGER 2,151,873
MACHINE TOOL
Filed Jan. 13, 1937 8 Sheets-Sheet 6
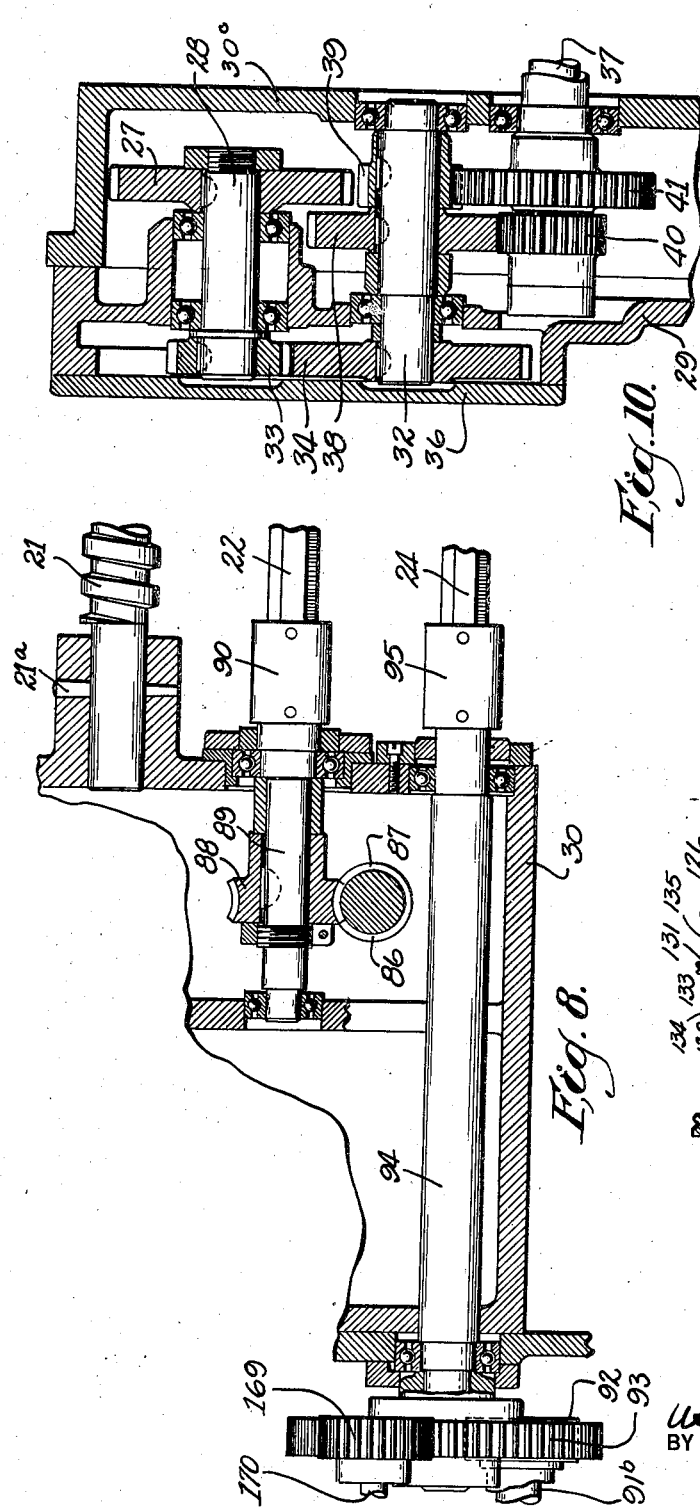
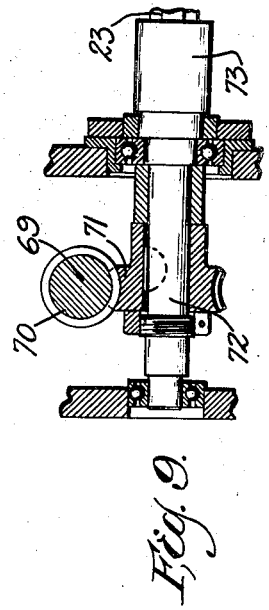
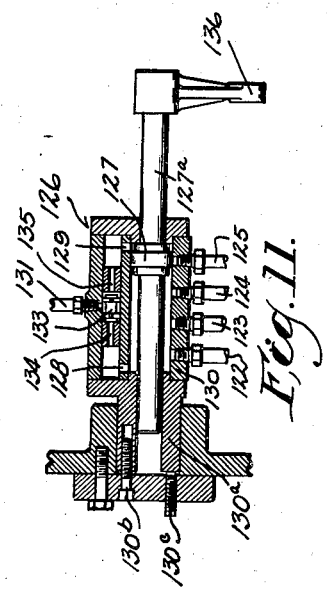
INVENTOR
Werner Irving Senger
BY
Fred G. Parsons
ATTORNEY

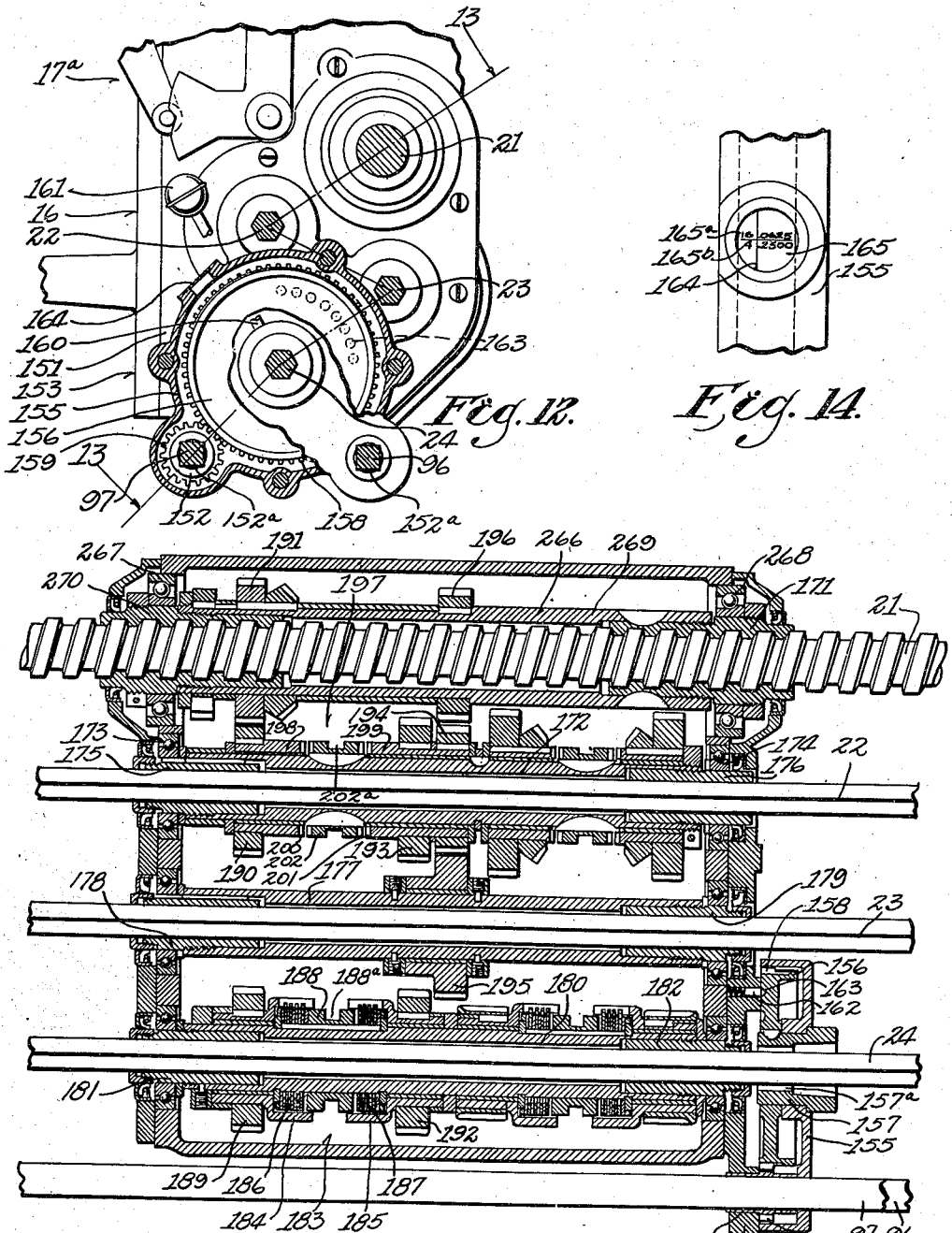

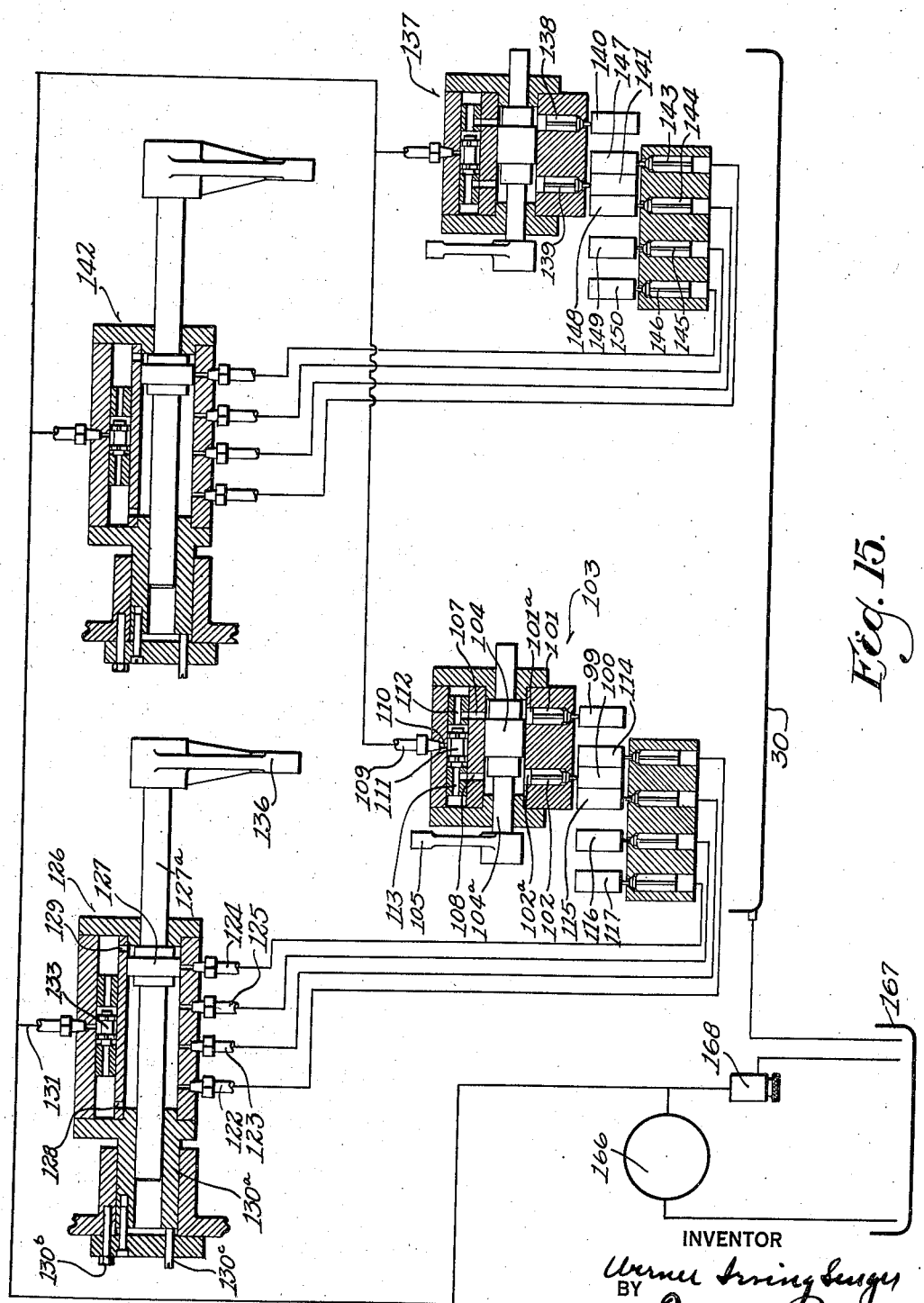

Patented Mar. 28, 1939

2,151,873

UNITED STATES PATENT OFFICE 2,151,873

MACHINE TOOL

Werner Irving Senger, Madison, Wis., assignor to Gisholt Machine Company, Madison, Wis., a corporation of Wisconsin Application January 13, 1937, Serial No. 120,343

21 Claims. (Cl. 82—21)

This application relates to machine tools, and more particularly to transmission and control mechanism therefore, and more especially for lathes.

A purpose of the invention is to provide an improved transmission and control mechanism for the relative movement of machine tool supports, and in improved relationship to other transmission and control mechanism, particularly for the movement of lathe tools.

A further purpose is to provide an improved unitary arrangement of transmission and control mechanism for actuating a support, and particularly where the support is a tool support of a lathe.

A further purpose is to provide a unitary mechanism of an improved form suitable to be removably supported adjacent the headstock end of a lathe or similar machine tool to drive one or a plurality of supports such for instance as a plurality of tool supports arranged for individual movement on the bed of a lathe, and particularly where the supports require movement at different rates, together with selector mechanism individual to the supports and adjacent thereto.

A further purpose is to provide an improved transmission in which power is received from a common source for the operation of different supports at the same or different rates, together with rate control mechanism at least in part individual to the different supports.

Another object is to provide an improved form of rate changer, together with control mechanism therefor, more especially for a feed rate control.

Another object is to provide an improved power operable rate changer, and especially in a form for hydraulic operation, to effect various of the adjustments for the rate changing operation.

A further purpose is to provide improved rate changers respectively for actuation of different machine tool supports, and control mechanism therefor which is in part common to both rate changers, and in part individual to the respective rate changers.

A further purpose is generally to simplify and improve the construction and operation of machine tools, particularly of lathes, and more especially with respect to transmission and control mechanism for the movement of the lathe tools. Still other purposes will be apparent from this specification.

The invention consists in the construction and relationship of parts as herein illustrated, described and claimed and in such modifications of the structure illustrated and described as is equivalent to the structure of the claims.

The same reference characters have been used to indicate the same parts throughout, and in the drawings:

Figure 3 is a left end elevation of a portion of a unit shown in Figs. 1 and 2, a cover and certain of the mechanism carried thereby having been removed, and the view being still further enlarged.

Figure 5 is a vertical section through the unit shown in Fig. 3, taken approximately along the line 5—5 of Fig. 1 and also of Fig. 4.

Figure 8 is a partial sectional development of a portion of the same unit, taken approximately along the line 8—8 of Fig. 6.

Figure 9 is a partial section of the same unit taken approximately along the line 9—9 of Fig. 6.

Figure 10 is a partial sectional development of a portion of the same unit taken approximately along the line 10—10 of Fig. 2.

Figure 11 is a partial section of the same unit taken approximately along line 11—11 of Fig. 5, and is substantially the same as a section taken along line 11a, 11a, Fig. 5.

Figure 12 is a right hand view partly in section of certain control mechanism carried by the carriage as shown in Fig. 1, and enlarged.

Figure 13 is a sectional development of certain of the carriage transmission and control mechanism, taken along line 13—13 of Fig. 12.

Figure 14 is a view of a portion of the control mechanism shown in Figs. 12, 13.

Figure 15 is a diagrammatic view showing certain of the control mechanism of the machine of Fig. 1 and certain interconnections thereof.

Figure 1:
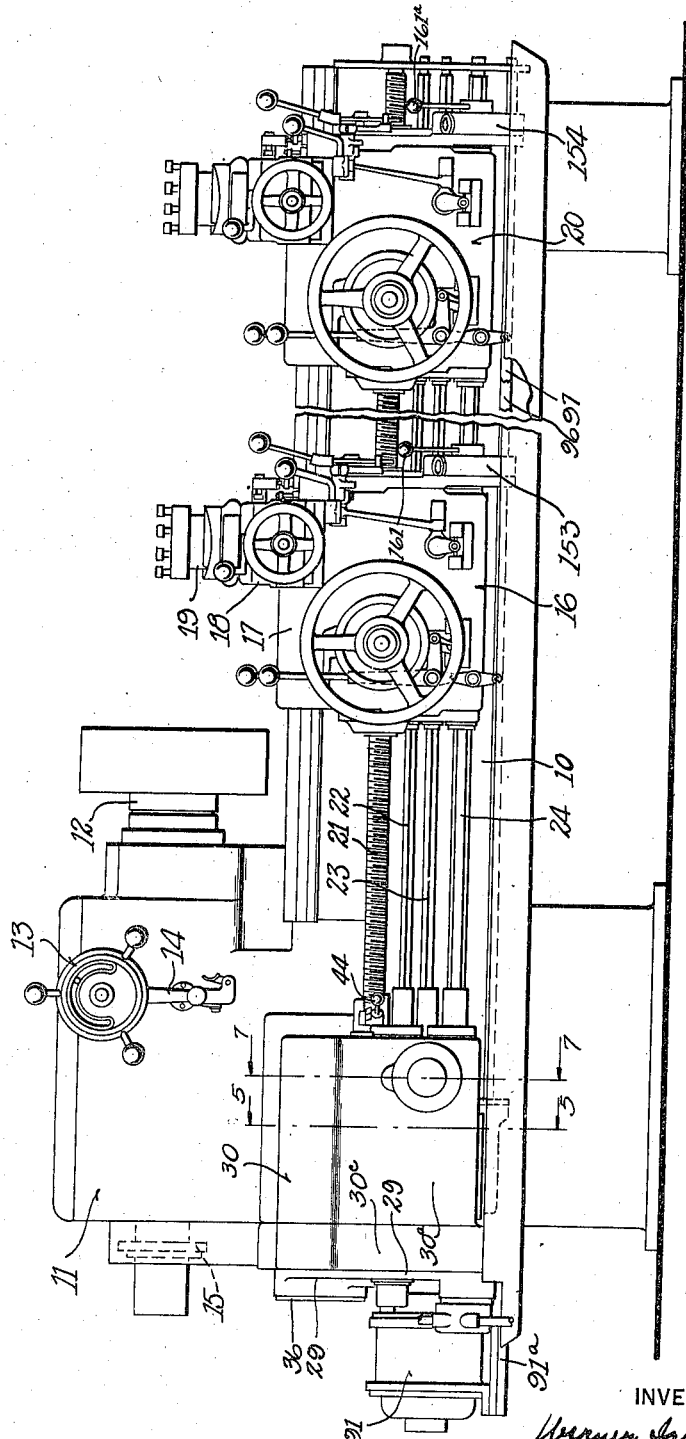
Figure 1 is a front elevation of a lathe incorporating the invention.

The lathe shown in Fig. 1 includes a bed 10 and a headstock portion generally denoted by the numeral 11, in which is rotatably mounted a work spindle 12 provided with suitable transmission and control mechanism for effecting various spindle speeds in either direction. The transmission and control mechanism for spindle 12 is preferably the same as that shown in a co-pending application, Serial No. 83,306, filed June 3, 1936, in which the transmission generally indicated as 12a, Fig. 2, includes rate change elements which may be shifted into a variety of position combinations, the particular combination for a desired speed being selected by the means of a controller here generally indicated by the numeral 13, the spindle transmission also including clutch and brake means controlled either by the controller 13 or by a hand lever here indicated by the numeral 14. As explained in said co-pending application the work spindle has fixed thereon a feed driving gear 15. The spindle transmission and control mechanism having been fully described in said co-pending application will not be here described.

The lathe also includes a tool carriage generally denoted by the numeral 16, Fig. 1. It includes a main portion 17 guided on suitable ways on the bed 10 for horizontal reciprocatory movement parallel with the axis of spindle 12, a cross slide 18 guided on the portion 17 for horizontal reciprocatory movement transverse to the movement of the member 17, and a tool holder 19 mounted on the cross slide 18 and adapted to rigidly support suitable tools for operation on work carried by the spindle 12.

The bed 10 as here shown is extended to the right in Fig. 1 to guide a second carriage generally indicated by the numeral 20, Fig. 1. Carriage 20 as here shown is substantially identical in construction with the carriage 16. It may be noted however that in either carriage 16 or 20 the tool holder 19 may be of any well known form usual in lathes, and may be mounted directly on the carriage instead of on a cross slide.

Where two carriages such as 16, 20 are used, each of the carriages will be provided with transmission and control mechanism for reciprocatory movement at least in the direction parallel with the spindle axis. Where a cross slide such as 18 is provided the carriage will also carry transmission and control mechanism individual to the transverse reciprocation of the cross slide. Such transmission and control mechanism is here shown, in part only, being more completely shown and described in said co-pending application, Serial No. 83,306.

Suitably spaced adjacent the front of the bed 10, there is a non-rotatable screw 21 which, at the headstock end, is rigidly fixed against both rotation and axial movement, as by a pin 21a, Fig. 8.

A plurality of transmission shafts 22 and 23 are suitably spaced at the front of bed 10, and respectively transmit feed rate motion to the carriages 17 and 20. Also extending along the front of the bed 10 is a quick traverse rate shaft 24 which serves to transmit quick traverse motion to either carriage 17 or 20.

Figure 6:
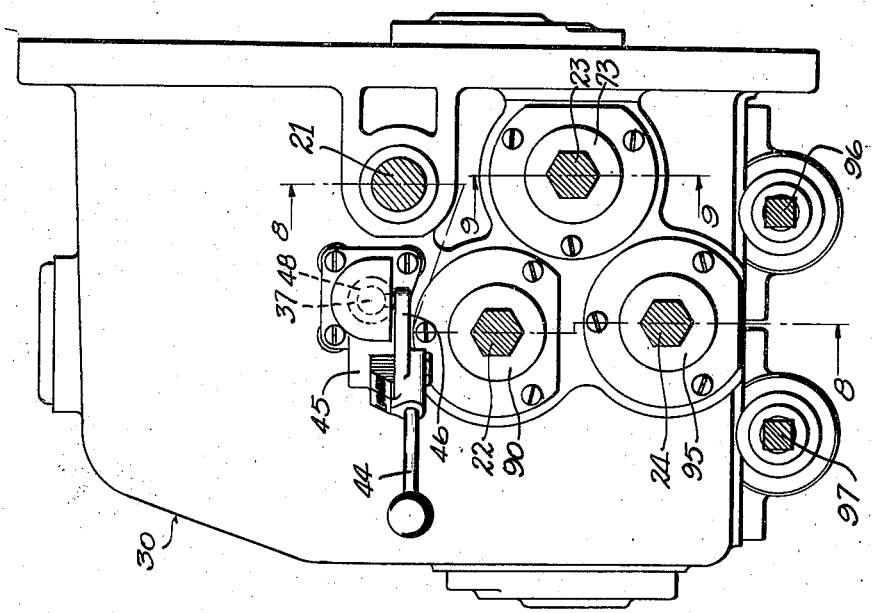
Figure 6 is a right hand elevation of the same unit.

The spaced shafts 22, 23, 24 are preferably hexagon in form as shown in Fig. 6, whereby they may transmit power to suitably apertured sleeves in the carriages 17, 20 without the use of exposed splines which, in the usual form, are an element of danger to an operator whose clothing may be caught by the sharp edges of the spline grooves.

Figure 2:
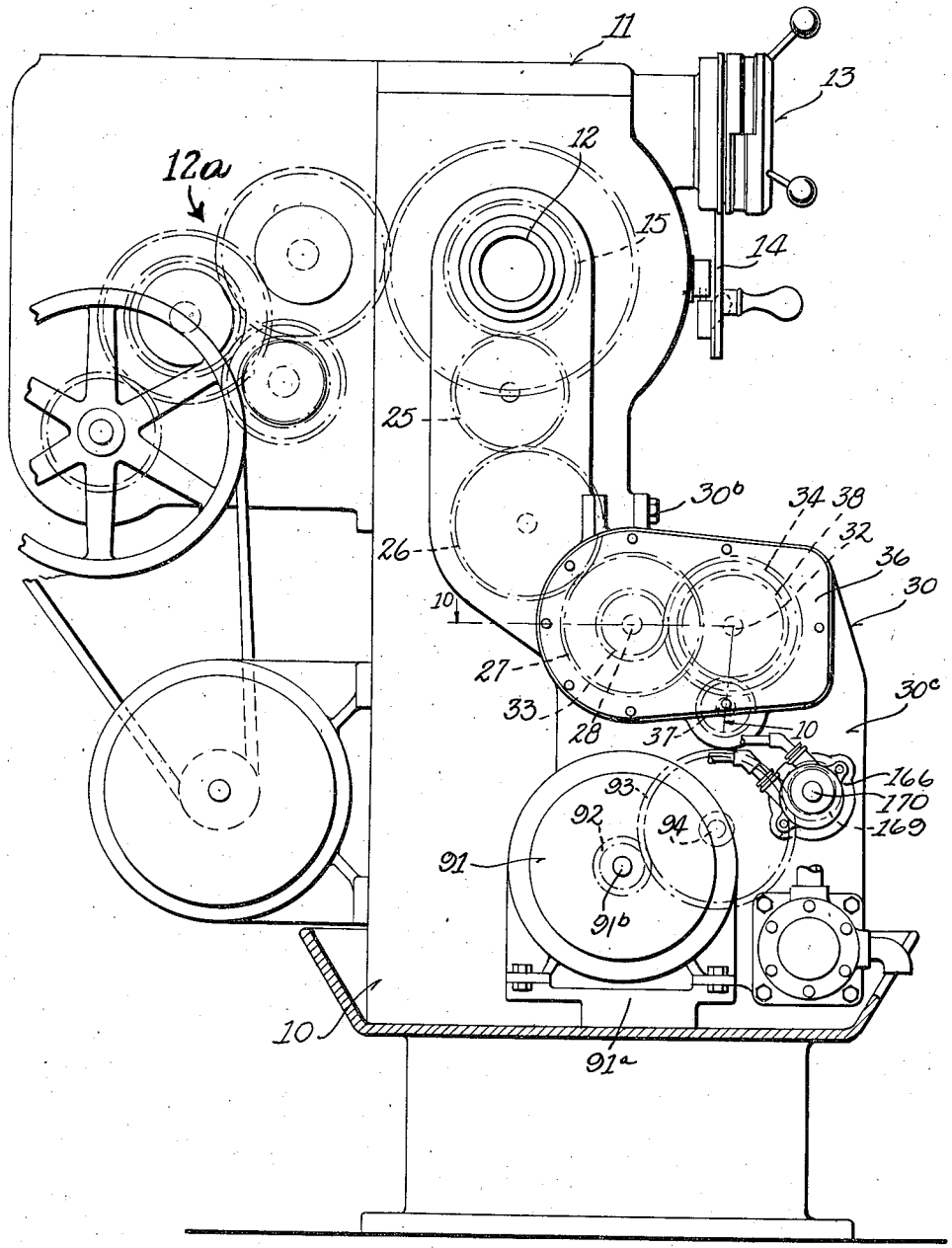
Figure 2 is a left end elevation of the same lathe shown in larger scale.

Feed rate motion is transmitted to each of the shafts 22, 23 from spindle 12 through the gear 15, Figs. 1, 2, and through idler gears 25, 26 suitably rotatably supported, the idler gear 26 being meshed with a gear 27, Figs. 2, 10 fixed on a short shaft 28 carried in suitable bearings on the cover plate 29 which is removably fixed on the housing of a removable unit generally denoted by the numeral 30, Figs. 1, 2, 6. This housing includes a main portion or frame 30a, Figs. 4, 5 etc. rigidly fixed with bed 1 by the means of screws such as 30b, Fig. 2, and a removable left end portion 30c, Figs. 4, 9, rigidly fixed with the main housing portion 30a by the means of screws such as 30d, Fig. 4.

The shaft 28, Fig. 10 drives a shaft 32 through a rate changer which may be of any suitable form, in this instance consisting of the different diameter gears 33, 34 respectively removably fixed on the different shafts, and interchangeable between the shafts to alter the speed of shaft 32 relative to the shaft 28. The reversible gear set 33, 34 is also replaceably interchangeable with other sets of still differently diametered gears. Access may be had for removable replacement or interchange of the gear sets such as 33, 34 by removing a cover plate 36.

Figure 4:
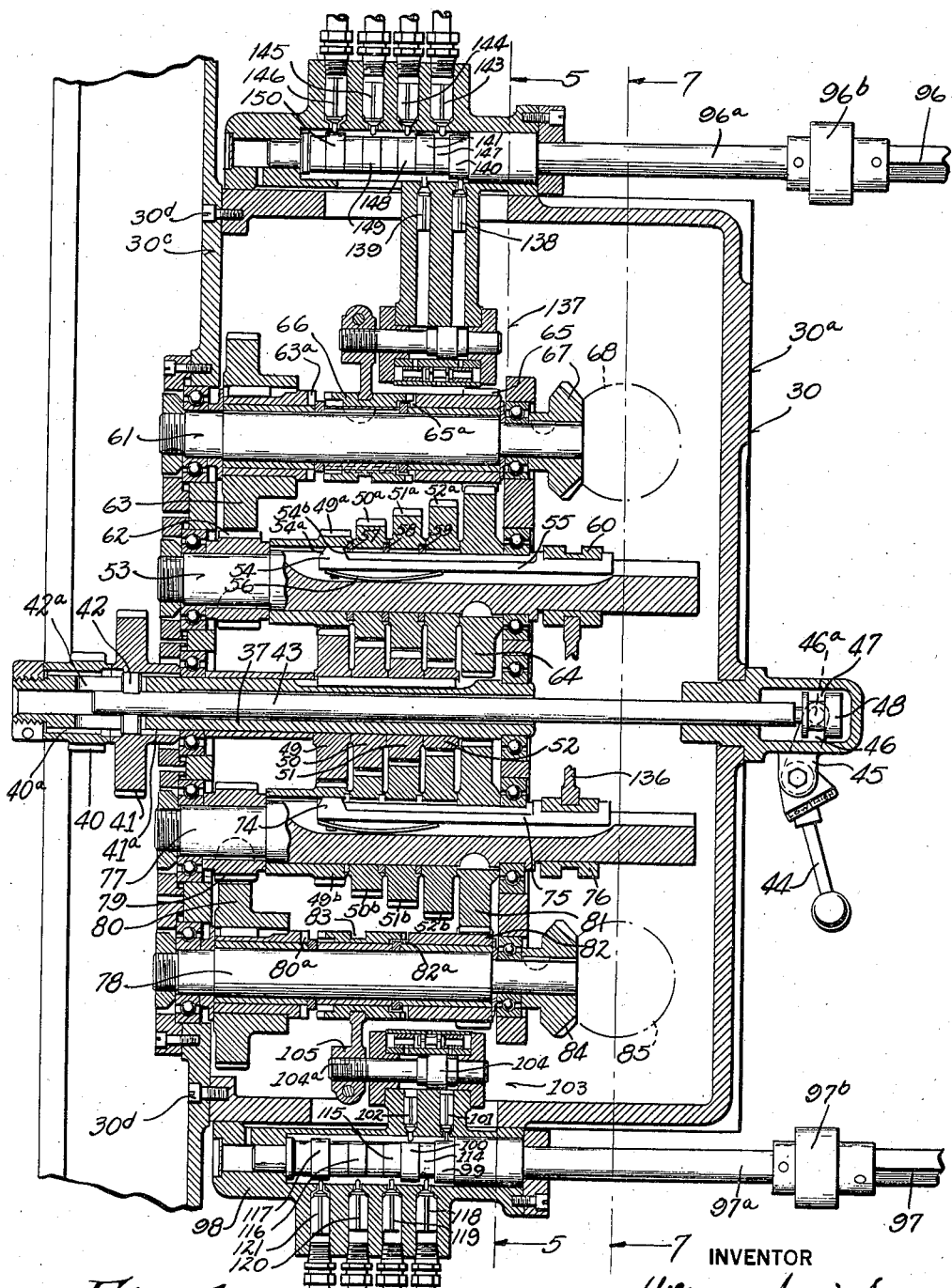
Figure 4 is a sectional development of certain of the mechanism of the unit shown in Fig. 3, taken approximately along the line 4—4 of Fig. 5.

Shaft 32 drives a shaft 37, Figs. 4, 10 through a rate changer which includes the different diametered gears 38, 39, Fig. 9, each fixed on the shaft 32 and complementary gears 40, 41 respectively meshed with the gears 38, 39 and rotatably carried by the projecting end of shaft 37, each of the gears 40, 41 having internal splined portions such as 40a, 41a alternatively engageable by a slidable key member 42 which extends through a suitable transverse slot 42a in the shaft 37 and is axially shiftable to effect the alternative gear engagement by a rod 43 extended through a suitable axial bore in shaft 37, the shifting mechanism including a hand lever 44, Figs. 1, 4, pivoted on a bracket 45 and having fixed therewith an arm 46 having a portion 46a engaging an annular groove 47 on a shifter spool 48 fixed on rod 43.

Shaft 37 actuates each of the shafts 22, 23, but through different trains each including a rate changer individual to the driven shaft. Each of the trains originates in a cone of different diametered gears 49, 50, 51, 52, Fig. 4, suitably keyed to rotate with shaft 37.

The train for driving shaft 23 from shaft 37 includes a cone of gears 49a, 50a, 51a, 52a respectively meshing with the gears 49, 50, 51, 52 and each supported on a shaft 53 for rotation independently thereof except as suitable internal splines of the one or the other gear are engaged by a key portion 54 of a sliding key member 55 normally urged toward engagement by a flat spring 56. Intermediate between each of the gears 49a, 50a, 51a, 52a there are abutment members such as 57, 58, 59 adapted to cooperate with the angular sides 54a, 54b of the key portion 54 in the one or the other direction of travel of the key member 55, whereby to disengage the key portion during the time it is traveling from the one to the other key, thereby to prevent simultaneous keyed engagement of a plurality of gears with the shaft 53. The key member 55 is selectively shifted to take up various positions keying the one or the other of the gears with the shaft 53 by the means of an annular shifter spool 60 engaging the key member, spool 60 being shifted and controlled as later described. The mechanism just described constitutes a rate change device adjustable to provide four different speeds of the shaft 53 relative to the shaft 37.

Shaft 53 drives a shaft 61 through a rate change device which includes gear pairs 62, 63, and 64, 65, the gears 62, 64 being fixed for rotation on shaft 53, and the gears 63, 65 being rotatably supported on shaft 61 and provided with the clutch faced hub portions 63a, 65a alternatively engageable in the opposite direction of movement of a clutch spool 66 suitably keyed on shaft 61 and shiftable by mechanism later described.

Figure 7:
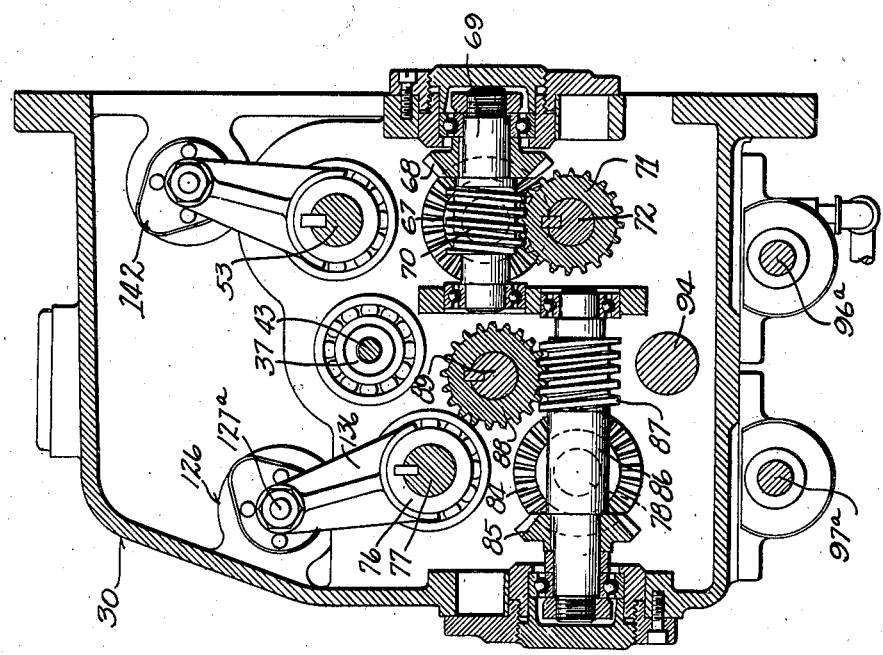
Figure 7 is a vertical section of the same unit taken approximately along the line 7—7 of Figs. 1 and 4.

The shaft 61 drives shaft 23 through a train including meshed bevel gears 67, 68, Figs. 4, 7, a shaft 69, a worm 70, a worm wheel 71, Figs. 7, 9, engaged therewith and a shaft 72 coaxial with the shaft 23 and coupled therewith by a suitable coupling member 73.

The shaft 22 is driven from shaft 37 through the cone of gears 49, 50, 51, 52, Fig. 4, and mechanism substantially identical with that just described for the driving of shaft 23. It includes a rate change device comprising gears 49b, 50b, 51b, 52b respectively complementary to the different gears 49, 50, 51, 52 and engageable one at a time by a shiftable key portion 74 of a key member 75 shifted by a shifter spool 76, the device driving a shaft 77 at four different speeds relative to the shaft 37 accordingly as the one or the other gears engage key portion 74. Shaft 77 drives a shaft 78, Fig. 4, through a rate change device including the gear pairs 79, 80 and 81, 82 alternatively connected to drive shaft 78 at one or the other of two speeds by the means of a clutch spool 83 shifted for engagement with the clutch portions 80a or 82a respectively associated with the different gears 80, 82, the clutch spool being shifted by means later described. Shaft 78 drives shaft 22 through a pair of meshed bevel gears 84, 85, Figs. 4, 7, a shaft 86, Figs. 7, 8, worm 87, worm wheel 88 and a shaft 89 co-axial with shaft 22 and coupled therewith by a suitable coupling 90.

The shaft 24 is driven at rapid traverse rate from a suitable power source such as a motor 91, Figs. 1, 2, suitably supported on bed 10 as for instance by a bracket 91a fixed with the plate 29, the motor drive shaft 91b, Fig. 8, having fixed thereon a pinion 92 meshing with a gear 93 fixed on a shaft 94 which is co-axial with the shaft 24 and coupled therewith by a suitable coupling member 95.

The rate change devices respectively controlled by the shifter spool 60, Fig. 4, and by the shiftable clutch 66 are each controlled from a rotatable control rod or shaft 96, Figs. 1, 4 which is common to the two devices. Similarly the rate change devices respectively controlled by the shifter spool 76 and the shiftable clutch 83 are each controlled from a rotatable control shaft 97, Figs. 1, 4. The rate control mechanism operable from control shafts 96, 97 being substantially identical will only be described in detail for the control shaft 97, as follows:

Shaft 97 is co-axial with a shaft 97a, Fig. 4, and coupled therewith by a suitable coupling 97b. Shaft 97a, at its left hand end, is provided with bearings in a bracket 98 fixed on housing member 30a, Figs. 4 and 5. Fixed on the shaft 97a are a plurality of cams 99, 100, Figs. 4, 15, respectively positioned to engage the projecting ends of poppet valves 101, 102, which respectively control, through ports 101a, 102a, the outlet of fluid from a shifter cylinder device generally indicated by the numeral 103, having a piston 104 upon the rod 104a of which is fixed a shifter fork member 105 engaging the annular groove of the clutch spool 83, previously referred to. The cylinder 106 of the piston 104 is provided with a plurality of inlet ports 107, 108 each receiving fluid from a supply pipe 109 through a port 110 and through a blocking valve or plunger 111, which may move in opposite directions respectively to close the channels 112, 113 in the event that pressure is relieved at the end of the piston 104 to which the channel delivers its fluid. The cams 99, 100 are formed to open the poppet valves 101, 102 one at a time during revolution of the shaft 97a, one of the poppet valves being opened when the other is closed, and upon the opening of a poppet valve, pressure will be relieved at the connected end of the piston, thereby causing the blocking valve 111 to move to close delivery of fluid to the corresponding piston end. Pressure is still maintained, however, at the other end of the piston, the result being that the piston will move in the direction of the open poppet valve to shift the clutch spool 83 in accordance with the angular position of rotation of shaft 97.

Also fixed on the shaft 97a, Fig. 4, are the cams 114, 115, 116, 117 respectively positioned to contact the exposed ends of poppet valves 118, 119, 120, 121, respectively positioned in channels separately connected, as by piping, to the outlet ports 122, 123, 124, 125 of a shifter piston device generally denoted by the numeral 126, Figs. 11 and 15. Piston device 126 includes a piston 127 and inlet ports 128, 129 respectively communicating with the opposite ends of the cylinder 130, and each connected with a pressure supply source through a pipe 131, and a blocking valve 133, which may shift in either direction to close the passages 134 or 135 respectively leading to the different inlet ports. The cams 114, 115, 116, 117, are so formed and positioned on shaft 97a that the poppet valves respectively associated with the different cams will be opened to relieve the fluid pressure through the outlet ports of the piston device 126, one at a time, as the shaft 97a is rotated. Upon opening of one of the poppet valves, the fluid pressure will move piston 127 to cover the port associated with the open poppet valve as follows:

Assuming that the poppet valve 119 associated with the outlet port 123 is open, fluid from supply port 132 will then flow through the port 123 and the open poppet valve. The initial flow of the fluid toward the open port 123 will immediately cause the blocking valve 133 to shift in the direction of the open port, thereby closing the supply of fluid to that port, and relieving the fluid pressure on the face of piston 127 which communicates with the open port. Pressure continues to be supplied to the other end of piston 127, which will then move in the direction of the open port and this movement must continue until the enlarged piston portion covers and blocks the outlet to the open port. The piston cannot move past the position in which the open port is blocked because immediately the port is blocked there is no outlet, and the piston will then be rigidly held by the fluid pressure in the position covering the open port.

It will thus be seen that the piston 127 will be caused to take up any one of the four positions determined by the spacing of the outlet ports 122, 123, 124, 125, accordingly as the associated poppet valves are opened by the cams. Fixed on the piston rod 127a is the shifter fork 136 engaging the annular groove of the shifter spool 76 previously described, and the position of the four outlet ports associated with the piston device 126 is such that the movement of the piston resulting from the opening of the one or the other ports as just explained causes the key 74 to shift to engage the different gears 49b, 50b, 51b, 52b. For purposes of adjustment during assembly of the unit the entire piston device 126 is mounted to be bodily shifted relative to the gears, the cylinder 130 having a shank 130a which may be shifted by a set screw 130b and locked in position by a screw 130c.

The rate changers respectively connecting the shafts 37 and 77, and connecting the shafts 77 and 78, are preferably of such range that a series of relatively high speeds obtained in the one position of the clutch spool 83 forms a continuation of a relatively low series of speeds obtained through the gears 79, 80. Thus to obtain the complete series of speeds available between shafts 37 and 77 requires the shifting of the key 74 through its several positions while the clutch spool 83 remains in one of its positions, then shifting the clutch spool 83 to its other position and shifting the key 74 through the same series of positions while the clutch spool 83 remains in its other position. The cams controlling the several poppet valves which in turn control the shifting of the key 74 and clutch spool 83 are arranged to effect this relationship between the movements of the clutch spool and shiftable key during one revolution of the control shaft 97. Thus during one revolution of the shaft 97 the clutch spool 83 occupies one of its positions during half of the shaft revolution and the other of its positions during the other half of the shaft revolution, and during each half revolution of shaft 97 the key 74 occupies all of its positions one at a time. There being eight different speeds obtainable in the various position combinations of the shiftable clutch 83 and the key 74, the various control cams are preferably so arranged that eight equi-angularly spaced positions of the shaft 97 open the proper poppet valves to effect such shifting of the clutch spool 83 and key 74 as will effect the different speeds in their numerical order progressively as the shaft 97 is rotated.

Similarly the speed of shaft 23 relative to the shaft 37 is controlled from the shaft 96, the clutch spool 66 having associated therewith a shifter piston device generally denoted by the numeral 137 controlled from poppet valves 138, 139 and the cams 140, 141 fixed on a shaft 96a co-axial with the shaft 96 and coupled therewith by a suitable coupling member 96b, the annular spool 60 for the shiftable key 54 having associated therewith a shifter piston device generally denoted by the numeral 142, Fig. 15, controlled by the poppet valves 143, 144, 145, 146 and the cams 147, 148, 149, 150 also fixed on the shaft 96a.

Each of the control shafts 96, 97 are extended to the right, Fig. 1, to be supported from one or more of a plurality of carriages such as 17, 20, the carriage preferably being provided with a dependent end plate portion such as 151, Figs. 1, 13 in which is rotatably supported a bushing such as 152 having an internal passageway 152a, Fig. 12 of a form to slidably receive the square shafts 96, 97, the bushing being fixed against axial movement relative to the carriage and the shaft engaging to rotate with the bushing.

Either control shaft 96 or 97 may be manually rotated by a selector device mounted on either carriage 17 or 20. Such selectors are generally indicated by the numerals 153, 154, Fig. 1. Preferably the selector fixed to a carriage selects the speed of the feed shaft used to drive the same carriage. In the present instance the carriage 17 is driven from feed shaft 22, and carriage 20 from feed shaft 23, as is later more fully explained and therefore the selector 153 operates control shaft 97, and selector 154 operates control shaft 96, whereby each selector controls the feed rate of the carriage upon which it is mounted. Since the selectors 153, 154 are substantially identical only one of them will be described in detail.

Selector 153 includes a housing portion 155, Figs. 12, 13, fixed on the end plate 151 of the carriage. Housing 155 rotatably supports a drum member 156, the hub of the drum being fixed on a bushing 157 journaled in the housing, and which, for convenience, is co-axial with the quick traverse shaft 24 and provided with a suitable axial bore 157a through which the shaft 24 extends. A gear 158 fixed with drum 156 engages a pinion 159 fixed on the sleeve 152. The hub of the bushing 157 is extended, as shown in Fig. 1 and has fixed therewith a hand lever 160 having a hand grip portion 161. The gear 158 is relatively of much larger diameter than the pinion 159, whereby a comparatively small angular movement of the hand grip 161 will turn the shaft 97 through the complete revolution required, as previously stated, for the control of the rate changers connecting the shafts 37 and 77 to change the speed of feed shaft 22, the several angular positions of the drum 156 and gear 158 which respectively correspond with the different speed effective positions of the shaft 97, being indicated by a spring pressed detent plunger 162, Fig. 13, engaging suitably spaced notches such as 163, Figs. 12 and 13 in the hub of the gear. The casing 155 is provided at a suitable point, to be conveniently viewed by the operator of the lathe, with an opening 164, Figs. 12, 14, and suitable markings, such as 165, Fig. 14, are provided on the periphery of the drum at angularly spaced points to be visible through the opening 164 in the several positions of the drum, the markings respectively indicating the feed rate effect of the transmission in the several corresponding positions of the selector.

By reason of the alternatively high and low rate at which, as previously explained, the shaft 37 may be driven in the different positions of the hand lever 44 and key 42, each position of the control shaft 97 may result in two different carriage feed rates respectively relatively high and relatively low. Each of the markings 165 therefore includes two numerical values such as 165a, 165b, Fig. 14. The operator in determining the actual rate of the carriage regards the one or the other of the markings in each position of the selector 153 accordingly as the hand lever 44, Figs. 1 and 4, is in the position indicating the low or high series of feeds.

It will be understood that, to rotate the control shaft 96 from the selector 154 mounted on carriage 20, the connection of the selector 154 to shaft 96 is the same as just described except that the shaft 96 is provided with a pinion, similar to the pinion 159, and the pinion on shaft 97 is omitted. In other words, for the carriage 20 the selector 154 is similar to the selector 153 just described except that the hand lever 161a, corresponding to hand lever 160 of selector 153, is connected to operate control shaft 96 through a pinion and bushing similar to the pinion 159 and bushing 152, but differently positioned to suit the position of shaft 96.

Hydraulic fluid for the shifter piston devices 103, 126, 137 and 142 is supplied through suitable piping, as diagrammatically indicated in Fig. 15, from a suitable pressure source such as a pump generally denoted by the numeral 166, Figs. 2 and 15, to which fluid is supplied from a suitable reservoir such as 167 and delivered to the piston devices through a suitable pressure control valve 168. Pump 166 may be driven from any suitable power source. In this instance the drive is from the gear 93, Fig. 8, through a pinion 169 fixed on the pump shaft 170. Excess fluid, and fluid escaping from the several poppet valves may be collected in the bottom of the housing of the unit 30 and returned to the reservoir 167.

The connection of the feed shafts 22, 23 and quick traverse shaft 24 for movement of the carriages 17, 20 is substantially identical for each carriage and will therefore be described for only the carriage 16. Referring to Figs. 12, 13, the stationary screw 21 extends through a suitable bore in the carriage apron, which is generally denoted by the numeral 17a, there being a nut sleeve device 266 engaged by the screw and rotatably supported but fixed against axial movement relative to the carriage by suitable bearings such as 267, 268. Nut device 266 includes a sleeve portion 269 and the nut portions 270, 171 each engaging screw 21 and relatively axially adjustable for eliminating back lash.

A sleeve device 172, Fig. 13, rotatably supported by bearings 173, 174, is co-axial with feed shaft 22 and comprises bushing portions 175, 176 having internal hexagon bores engaging the hexagon of the feed shaft to drive the sleeve device. A similar sleeve device 177, having bushings 178, 179, is co-axial with the feed shaft 23 but in this instance is not utilized except to rotatably support reverser gearing, later described. Another sleeve device 180, similarly to the device 172, is provided with bushings 181, 182 which provide hexagon bores to drive the sleeve from the quick traverse shaft 24.

The several sleeve devices 266, 172, 177, 180, Fig. 13, are interconnected to provide quick traverse reverser and feed reverser devices respectively operative between the quick traverse shaft 24 and feed shaft 22 and the nut sleeve device 266, as follows:

For quick traverse rate drive of the nut device 266 there is provided a reverser clutch generally denoted by the numeral 183, Fig. 13, which includes a plurality of spaced outer clutch members 184, 185 respectively associated with groups of clutch friction plates 186, 187, the plates of each group being slidably alternately keyed with the associated outer clutch member and with the sleeve 180, the plates of the different groups being alternatively engageable to drive the different outer clutch members 184, 185, by the means of an axially slidable clutch spool 188 which may be shifted in either axial direction to set up the drive through the one or the other clutch member 184, 185 or to position the spool centrally to interrupt the drive by the means of suitable manually operable shifter means including a suitable fork member (not shown) engaging the annular groove 188a of the spool 188.

The clutch members 184, 185, Fig. 13 are each connected with nut sleeve 266, respectively through the train of gears comprising gears 189, 190, 191, and through the train comprising gears 192, 193, 194, 195, 196, the arrangement being such that shifting of the clutch spool 188 in the one direction drives the sleeve nut 266 at quick traverse rate in the one direction and opposite shifting of the spool drives the sleeve nut in the other direction, while an intermediate position of the spool disengages both groups of friction plates 186, 187 and permits the sleeve nut to be driven at feed rate, as will now be described. It will be understood that the gears 189, 190 also 192, 193, also 195, 196, although not shown meshed in the developed section, Fig. 13, are actually meshed in driving engagement in the shaft position shown in Fig. 12.

For feed rate drive of the nut sleeve 266 there is provided a reverser clutch generally denoted by the numeral 197, Fig. 13. Clutch sleeves 198, 199 are rotatably supported in the sleeve 172 and respectively provided on their inner adjacent ends with clutch jaws 200, 201. A clutch spool member 202 is slidably keyed on sleeve 172 and positioned between the sleeves 198, 199, the member having end clutch faces alternatively engageable with the clutch jaws 200, 201 as the member is axially shifted in opposite direction, and having an intermediate position disengaging the member from either clutch engagement. Clutch member 202 may be shifted to drive the one or the other sleeve 198, 199 from sleeve 172 or to position the member centrally to interrupt the drive, by the means of suitable shifter mechanism including a suitable shifter fork (not shown) engaging the annular groove 202a of the member.

The clutch sleeves 198, 199 respectively have fixed thereon the gear 190, and the two gears 193, 194 of the trains previously described, and therefore are respectively connected with the nut sleeve 266 through a gear train including the gears 190, 191 and through a train including the gears 194, 195, 196, these trains operating to drive the nut sleeve 266 in opposite directions according to the engagement of the one or the other of the clutch sleeves by the clutch member 201.

It will thus be apparent that by suitably shifting the one or the other reverser 183 or 197 the nut sleeve 166 may be rotated in either direction at either feed or quick traverse rate, whereby to traverse the carriage 17 in either direction at either rate, or the drive may be interrupted through both reversers whereby to interrupt the carriage movement.

Certain other mechanism shown in Fig. 13 is for the purpose of manual movement of the carriage 17, and for feed and quick traverse movement of the cross slide 18 in either direction of cross movement, but since such other mechanism is not essential to the invention as herein claimed it is not here described.

The carriage 20 is connected to be driven from the quick traverse shaft 24 and from the feed shaft 23 in either direction at either rate by mechanism operating in a manner exactly similar to the drive for the carriage 17 as just described, excepting only that for the carriage 20, in order that the carriage shall receive its feed drive from the shaft 23, the sleeve 177 is constructed to carry the feed reverser 197 and gears 190, 193, 194, in the manner shown in Fig. 13 for the sleeve 172, and the sleeve 172 is constructed to carry the idler gear 192 in the manner shown in Fig. 13 for the sleeve 177. Owing to the spacing of the several shafts, as shown in Fig. 12, this will result in gear trains connecting the reversers of the carriage 20 for operation of its sleeve nut in a manner identical with that for the carriage 17, except that the relative positions of the gear axes is somewhat different.

What is claimed is:

1. In a lathe, the combination of a bed, a rotatable work spindle, a plurality of spaced tool supports each carried on said bed and each independently movable relative to said spindle, a spindle transmission, and transmission and control mechanism for said tool supports each driven through said spindle transmission and respectively individual to the different supports, power operable shifter devices respectively for adjustment of different of said rate changers, controller devices respectively for controlling power connection to different of said shifter devices, a plurality of adjustable rate selector devices respectively independently movable with the different supports, and motion transmitting connections respectively from the different selector devices for effecting adjustment of the different controller devices in accordance with the adjustment of the connected selector device.

2. In a lathe, the combination of a bed, a rotatable work spindle, a plurality of spaced tool supports each carried on said bed and each independently movable relative to said spindle, a spindle transmission, and transmission and control mechanism for said tool supports including a plurality of adjustable rate changers each driven through said spindle transmission and respectively individual to the different supports, fluid operable shifter devices respectively for adjustment of different of said rate changers, valve devices respectively for controlling pressure fluid connection to different of said shifter devices, a plurality of adjustable rate selector devices respectively independently movable with the different supports, motion transmitting connections respectively from the different selector devices for effecting adjustment of the different valve devices in accordance with the adjustment of the connected selector device.

3. In a lathe, the combination of a bed, a rotatable work spindle, a plurality of spaced tool supports each carried on said bed and each independently movable relative to said spindle, a spindle transmission, and transmission and control mechanism for said tool supports including a plurality of adjustable rate changers each driven through said spindle transmission and respectively individual to the different supports and each carried by said bed at a point adjacent said spindle, power operable shifter devices respectively for different of said rate changers, controller devices carried by said bed adjacent said spindle and respectively for controlling the power connection to different of said shifter devices, a plurality of adjustable rate selector devices respectively independently movable with the different supports, and extensible motion transmitting connections respectively from the different selector devices for effecting adjustment of the different controller devices.

4. In a lathe, the combination of a bed, a rotatable work spindle, a plurality of spaced tool supports each carried on said bed and each independently movable relative to said spindle, and transmission and control mechanism for said tool supports including a plurality of adjustable rate changers respectively individual to the different supports, a plurality of rate change selectors respectively independently movable with the different supports, motion transmitting connections respectively from the different selectors for effecting rate change adjustment of the rate changer individual to the support movable with the selector, and a common driving train for said rate changers including another rate changer effective on both said supports, said independent selectors each including chart and indicator means visually indicating a support rate effected by adjustment of the selector in either of alternative rate positions of the rate changer in said common drive train.

5. In a lathe, the combination of a bed, a work spindle rotatably supported adjacent one end of said bed, a plurality of tool supports each guided on said bed for independent horizontal movement in a path parallel with said axis, said tool supports being spaced apart in the direction of said axis, a plurality of adjustable rate changers respectively individual to the different supports, power operable shifter devices respectively for adjustment of different of said rate changers, controller devices respectively for controlling the power connection to different of said shifter devices, a plurality of adjustable rate change selectors respectively bodily movable with the different supports, motion transmitting connections respectively from the different selectors for effecting adjustment of the different controller devices in accordance with the adjustment of the connected controller device, and a common driving train for said rate changers including another rate changer effective on both said supports, said selectors each including chart and indicator means visually indicating a support rate effected by adjustment of the selector in alternative rate positions of the rate changer in said common drive train.

6. A transmission and control mechanism for machine tools comprising axially parallel spaced shafts, a plurality of different diametered gears axially spaced on one of said shafts, a plurality of different diametered gears axially spaced on the other shaft and respectively engaging different of the first mentioned gears to provide gear pairs of different ratio connectible between said shafts, the gears on one of said shafts providing internal keyways, a key member associated with the last mentioned shaft and slidably engageable with the keyways of different of said keywayed gears one at a time, a power operable shifter for movement of said key member to its different gear engaging positions, a power source for said power operable shifter, a selector having alternative positions respectively corresponding to the different gear engaging key member positions, and controller means for connection of said power source and shifter to effect the different positions of said member in accordance with the movement of said selector.

7. A transmission and control mechanism for machine tools comprising spaced shafts, a plurality of different diametered gears axially spaced on one of said shafts, a plurality of different diametered gears axially spaced on the other shaft and respectively engaging different of the first mentioned gears to provide gear pairs of different ratio connectible between said shafts, the gears on one of said shafts providing internal keyways, a key member associated with the last mentioned shaft and slidably engageable with the keyways of different of said keywayed gears one at a time, a fluid operable piston device for movement of said key member to its different gear engaging positions including a cylinder having normally closed spaced outlet ports respectively for effecting the different key member positions, a selector having alternative positions respectively corresponding to the different key member positions, controller means connecting said selector in each selector position to open the cylinder port corresponding to the position of the selector, and fluid pressure supply means for said cylinder and operable to shift said piston to the position corresponding to the position of the port opened by said controller means.

8. A transmission and control mechanism for machine tools including a plurality of serially arranged rate change devices, one of said devices including a shiftable rate change member having different positions, the other of said devices including spaced shafts, a plurality of different diametered gears axially spaced on one of said shafts, a plurality of different diametered gears axially spaced on the other shaft and respectively engaging different of the first mentioned gears to provide gear pairs of different ratio connectible between said shafts, the gears of one of said shafts providing internal keyways, and a key member associated with the last mentioned shaft and slidably engageable with the keyways of different of said keywayed gears one at a time, the shifting of said key member providing a series of speeds of small individual increment of rate change relative to the rate change effected by the shifting of said rate change member, a rate change selector including chart and indicator means having various rate indicating positions, and motion transmitting means connecting said selector for adjustment of said rate change devices in an order including adjustment of said key member to effect said series of speeds followed by adjustment of said rate change member from one to another of its positions.

9. A transmission and control mechanism for machine tools including a plurality of serially arranged rate change devices, one of said devices including a shiftable rate change member having different positions, the other of said devices including spaced shafts, a plurality of different diametered gears axially spaced on one of said shafts, a plurality of different diametered gears axially spaced on the other shaft and respectively engaging different of the first mentioned gears to provide gear pairs of different ratio connectible between said shafts, the gears of one of said shafts providing internal keyways, and a key member associated with the last mentioned shaft and slidably engageable with the keyways of different of said keywayed gears one at a time, the shifting of said key member providing a series of speeds of small individual increment of rate change relative to the rate change effected by the shifting of said rate change member, a rate change selector including chart and indicator means having various rate indicating positions, a plurality of power operable shifters respectively for effecting said different positions of said rate change member and for effecting the various positions of said key member, a power source, and controller means operable from said selector for connecting said power source and shifters for adjustment of said rate change devices in an order including adjustment of said key member to effect said series of speeds followed by adjustment of said rate change member from the one to another of its positions.

10. A transmission and control mechanism for machine tools including a plurality of serially arranged rate change devices, one of said devices including a rate change member having different positions, the other of said devices including spaced shafts, a plurality of different diametered gears axially spaced on one of said shafts, a plurality of different diametered gears axially spaced on the other shaft and respectively engaging different of the first mentioned gears to provide gear pairs of different ratio connectible between said shafts, the gears of one of said shafts providing internal keyways, a key member associated with the last mentioned shaft and slidably engageable with the keyways of different of said keywayed gears one at a time, the shifting of said key member providing a series of speeds of small individual increment of rate change relative to the rate change effected by the shifting of said rate change member, a rate change selector inclusing chart and indicator means having various rate indicating positions, a plurality of fluid operable shifters respectively for effecting said different positions of said rate change member and for effecting the various positions of said key member, a source of pressure fluid, valve means for connecting said source and shifters for rate change adjustment, and means connecting said selector for operation of said valve means to effect said rate change adjustment in an order including adjustment of said key member to effect said series of speeds followed by adjustment of said rate change member from the one to another of its positions.

11. In a lathe, the combination of a bed, a work spindle rotatably supported adjacent one end of said bed, a tool support guided on said bed for horizontal movement in a path parallel with the spindle axis, transmission mechanism for movement of said support including a plurality of independently adjustable rate changers serially arranged, and a plurality of individually operable selectors respectively connected for operation of different of said rate changers, one of said selectors being movable with said support, the last mentioned selector including chart and indicator means simultaneously visibly indicating a support rate effected by adjustment thereof in a plurality of rate changer adjusting positions of the other selector.

12. In a lathe, the combination of a bed, a work spindle rotatably supported adjacent one end of said bed, a tool support guided on said bed for horizontal movement in a path parallel with the spindle axis, transmission mechanism for said support including a plurality of rate change devices serially arranged, one of said devices comprising a member shiftable to different rate change positions, the other of said devices comprising an element shiftable to a plurality of rate change positions providing a series of rates of small individual increment of rate change relative to the rate change effect of the shifting of said member, a rate change selector movable with said support and including chart and indicator means having various rate indicating positions, and motion transmitting connection means connecting said selector for adjustment of said member and element in a cycle including the adjustment of said element to effect said series of rates followed by adjustment of said member from one to another of its positions.

13. In a lathe, the combination of a bed, an axially horizontal work spindle rotatably supported adjacent one end of said bed, a tool support guided on said bed for movement in a path parallel with the axis of said spindle, transmission mechanism for said support including a plurality of rate change devices serially arranged and each fixed on said bed adjacent said spindle, one of said devices comprising a member shiftable to different rate change positions, the other device comprising an element shiftable to a plurality of rate change positions providing a series of rates of small individual increment of rate change relative to the rate change effect of the shifting of said member, a rate change selector movable with said support and including chart and indicator means having various rate indicating positions, and extensible motion transmitting connection means connecting said selector for adjustment of said member and element in a cycle including the adjustment of said element to effect said series of speeds prior to the adjustment of said member.

14. In a lathe, the combination of a bed, a work spindle rotatably supported adjacent one end of said bed, a tool support guided on said bed for horizontal movement parallel with the spindle axis, transmission mechanism for said tool support including an adjustable rate changer fixed with said bed adjacent said tool spindle, a power operable shifter for said rate changer, a power source connectible for operation of said shifter, an adjustable rate selector bodily movable with said support, and motion transmitting connections for effecting various power connections of said source and shifter in accordance with the position of adjustment of said selector and in various positions of the bodily movement thereof.

15. In a lathe, the combination of a bed, a work spindle rotatably supported adjacent one end of said bed, a tool support guided on said bed for horizontal movement parallel with the spindle axis, transmission mechanism for said tool support including an adjustable rate changer fixed with said bed adjacent said tool spindle, a fluid operable shifter for said rate changer, a fluid pressure source connectible with said shifter, valve means adjustable for controlling the connection of said source and shifter, an adjustable rate change selector bodily movable with said support and having various positions of adjustment corresponding to the different rate effects of said rate changer, and motion transmittting connections from said selector for adjustment of said valve means in accordance with the position of adjustment of said selector and in various positions of the bodily movement thereof.

16. In a lathe, the combination of a bed, a work spindle rotatably supported adjacent one end of said bed, a tool support guided on said bed for horizontal movement parallel with the spindle axis, transmission mechanism for said tool support including an adjustable rate changer fixed with said bed adjacent said tool spindle, a fluid operable shifter for said rate changer, a fluid pressure source connectible with said shifter, valve means adjustable for controlling the connection of said source and shifter, an adjustable rate change selector bodily movable with said support and having various positions of adjustment respectively corresponding to the different rate effects of said rate changer, and motion transmitting connections from said selector for adjustment of said valve means in accordance with the position of adjustment of said selector, said motion transmitting connection including a rotatable shaft axially parallel with the path of movement of said support.

17. In a lathe, the combination of a bed, an axially horizontal work spindle rotatably supported adjacent one end of said bed, a tool support guided on said bed for movement in a path parallel with the axis of said spindle, transmission mechanism for said support including a plurality of rate change devices serially arranged and each fixed on said bed adjacent said spindle, one of said devices comprising a member shiftable to different rate change positions, the other device comprising an element shiftable to a plurality of rate change positions providing a series of rates of small individual increment of rate change relative to the rate change effect of the shifting of said member, a rate change selector movable with said support and including chart and indicator means having various rate indicating positions, a plurality of power operable shifters respectively for said member and for said element, a power source connectible for operation of said shifters, and motion transmitting connections for effecting various power connections of said source and shifters in accordance with the various rate indicating positions of said chart and indicator means.

18. In a lathe, the combination of a bed, an axially horizontal work spindle rotatably supported adjacent one end of said bed, a tool support guided on said bed for movement in a path parallel with the axis of said spindle, transmission mechanism for said support including a plurality of rate change devices serially arranged, one of said devices comprising a member shiftable to different rate change positions, the other device comprising an element shiftable to a plurality of rate change positions providing a series of rates of small individual increment of rate change relative to the rate change effect of the shifting of said member, a rate change selector movable with said support and including chart and indicator means having various rate indicating positions, a plurality of power operable shifters respectively for said member and for said element, a power source, and controller means operable from said selector for connecting said source and shifters for adjustment of said rate change devices in a cycle effecting said series of rates prior to the adjustment of said member.

19. In a lathe, the combination of a bed, an axially horizontal work spindle rotatably supported adjacent one end of said bed, a tool support guided on said bed for movement in a path parallel with the axis of said spindle, transmission mechanism for said support including a plurality of rate change devices serially arranged, one of said devices comprising a member shiftable to different rate change positions, the other device comprising an element shiftable to a plurality of rate change positions providing a series of rates of small individual increment of rate change relative to the rate change effect of the shifting of said member, a rate change selector bodily movable with said support and including chart and indicator means having various rate indicating positions, a plurality of fluid operable shifters respectively for said member and for said element, a pressure fluid source, valve means for connecting said source and shifters for effecting various rate position combinations of said member and element, and motion transmitting connections from said selector for controlling said valve means to effect said source and shifter connections in an order productive of said series of speeds followed by the adjustment of said member.

20. In a lathe, the combination of a bed, an axially horizontal work spindle rotatably supported adjacent one end of said bed, a tool support guided on said bed for movement in a path parallel with the axis of said spindle, transmission mechanism for said support including a plurality of rate change devices serially arranged and each fixed on said bed adjacent said spindle, one of said devices comprising a member shiftable to different rate change positions, the other device comprising an element shiftable to a plurality of rate change positions providing a series of rates of small individual increment of rate change relative to the rate change effect of the shifting of said member, a rate change selector bodily movable with said support and including chart and indicator means having various rate indicating positions, a plurality of fluid operable shifters respectively for said member and for said element, and each carried by said bed adjacent said spindle, a pressure fluid source, valve means associated with said shifters adjacent said spindle for connecting said source and shifters for effecting various rate position combinations of said member and element, and extensible motion transmitting connections connecting said selector and valve means to effect shifter movements in an order productive of the adjustment of said element to each rate change position thereof followed by the adjustment of said member.

21. In a lathe, the combination of a bed, an axially horizontal work spindle carried by said bed adjacent one end thereof, a tool support guided on said bed for horizontal movement in a path parallel to the axis of said spindle, a housing removably fixed on said bed adjacent said spindle, and transmission and control mechanism for said carriage including adjustable rate change devices and power operable shifters therefor unitarily carried by said housing, a rate change selector carried by said support, and a motion transmitting connection from said selector for controlling the power connection of said shifters in various positions of said support.

WERNER IRVING SENGER.